Patented May 3, 1927.

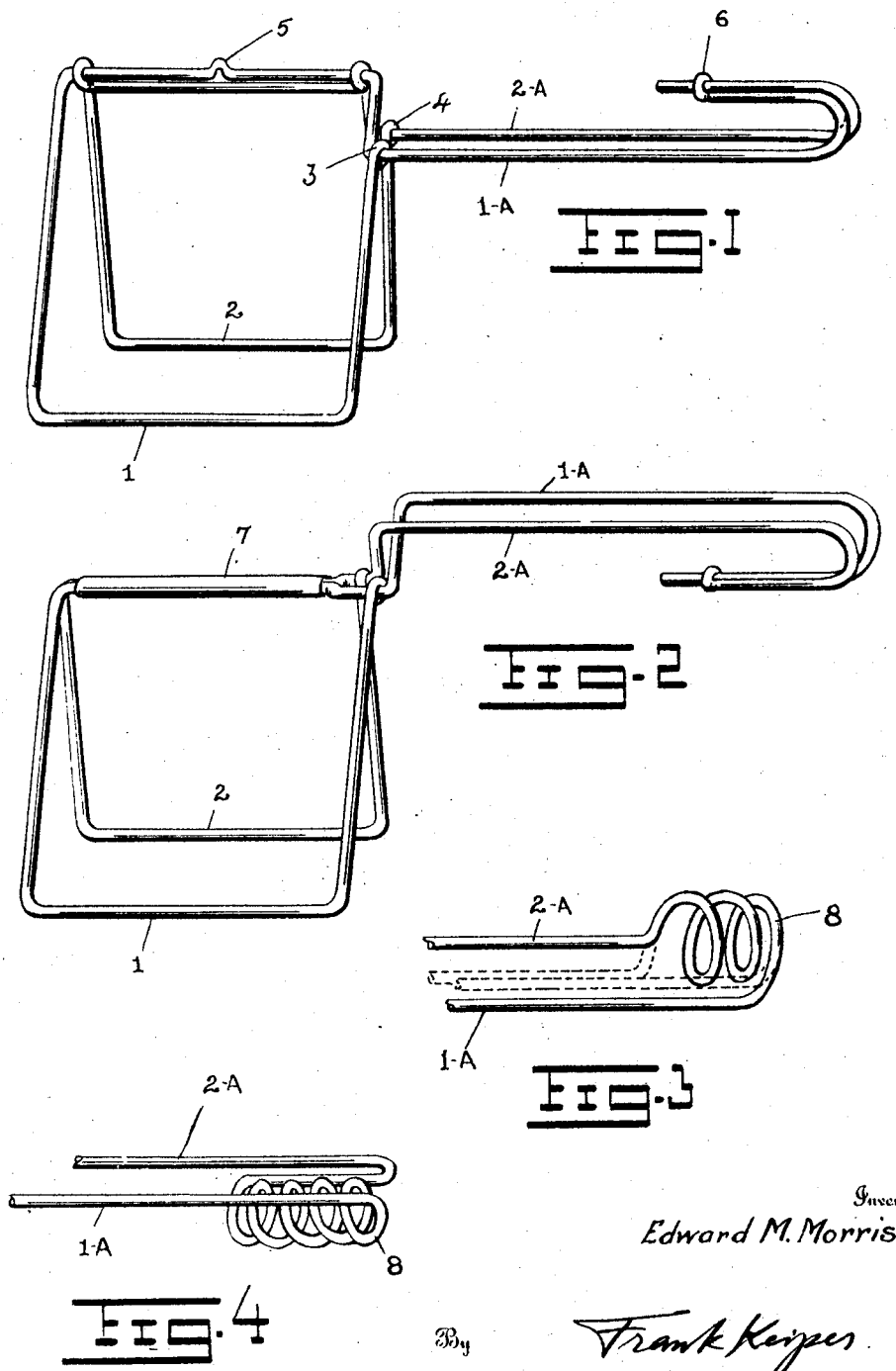

1,627,524

UNITED STATES PATENT OFFICE.

EDWARD M. MORRIS, OF ROCHESTER, NEW YORK.

LIFTING TONGS.

Application filed May 29, 1926. Serial No. 112,640.

The object of this invention is to provide a new and improved type of lifting tongs which are especially adapted for handling heated pans, hot pie plates in fact any heated cooking or baking utensil that is to be removed from the stove or oven. The lifting tongs are also useful for the purpose of removing potatoes, sausages, etc., from the camp grate or camp stove.

These and other objects of this invention will be fully illustrated in the drawing, described in the specification and pointed out in the claims at the end thereof.

In the accompanying drawing:

Figure 1 is a perspective view of the lifting tongs.

Figure 2 is a perspective view of a modified form of the lifting tongs.

Figures 3 and 4 are detail perspective views of two modified forms of the handle of the lifting tongs.

In the several figures of the drawing like reference numerals indicate like parts.

The lifting tongs forming the subject matter of my present invention are an improvement over other similar tongs in that the tongs can be efficiently handled to engage the object to be firmly gripped thereby.

As illustrated in the figures the tongs are preferably bent up from two lengths of wires. The portion of the tongs with which the gripping and holding is done is formed by a pair of rectangular frames or loops 1 and 2. These frames or loops are bent up as illustrated in Figures 1 and 2. Each is provided with a handle portion 1A and 2A respectively. The loops or frames 1 and 2 are closed by winding the end of the wire around the inner end of the handle portion as indicated at 3 and 4. In the form of tongs illustrated in Figure 1 the frame or loop 2 is hinged on the frame or loop 1 and for this reason the upper end of the frame or loop 2 is bent over and around the top of the loop or frame 1. If desired a small kink or bump 5 may be bent into the top of the frame or loop 1 forming a stop with which the top of the frame or loop 2 will make contact and prevent this loop from swinging back over the loop 1. The handle portion of each loop extends rearwardly and the ends are curved up and bent back with the end of one handle portion formed into the loop 6 and the end of the other handle portion projecting thru this loop. In this way the handle portions 1A and 2A are hinged together approximately in line with the hinged tops of the frames or loops 1 and 2 of which they form a part. Each frame or loop can thus swing independently on the other by manipulating the handle made up of the handle portions 1A and 2A, and the loops or frames 1 and 2 can be swung open or closed to grip or release an object between them.

In the modification illustrated in Figure 2 the two frames or loops 1 and 2 are hinged together at the top by means of the sleeve or tubing 7. This tubing encircles both of the upper ends of the frames or loops 1 and 2. As illustrated the upper right hand corner of each of the frames 1 and 2 illustrated in Figure 2 are slightly offset to allow the top of the frames to lie parallel to each other. The handle portions of each of the frames is bent up from the loops but at the rear they are bent down and forward again and pivoted together as illustrated in Figure 1.

In Figures 3 and 4 I have illustrated a modification of the handle of the tongs. In these modifications the tongs are bent up from a single length of wire so that the handle sections 1A and 2A are continuous, that is, are integral with each other. In order to make these handle sections movable with relation to each other so that the frames or loops can be opened or closed by means of them, a coil section 8 is formed between them. This coil section normally holds the handle sections apart, that is keeps the gripping frames or loops spread apart. When it is desired to grip an object with the tongs the handle sections are forced together by the hand against the expanding force exerted by the coil 8. On the release of the handle sections the coil again spreads them apart and opens the tongs.

The coil illustrated in Figure 3 is formed and located at the ends of the handle sections while the coil illustrated in Figure 4 is bent under and extends forward of the ends of the handle sections.

I claim:

1. In a pair of lifting tongs, the combination of a pair of wire frames or loops hinged together at the top, a handle section projecting rearwardly from each of said loops, the end of said handle sections being bent forwardly with the end of one handle section having an eye formed thereon and the end of the other of said handle sections passing thru said eye to form a pivotal connection between said handle sections approximately in line with the hinged tops of said pair of wire frames.

2. In a pair of lifting tongs, the combination of a pair of wire frames, a pivotal connection between the top of each of said pair of frames, a lug formed in the top of one of said frames, said lug forming a stop to limit the swinging movement, said wire frames, a handle section formed integral with each of said wire frames, means connecting the ends of said handle sections to allow the independent movement of each of said handle sections and swing them on a center approximately in line with the pivotal connection between said wire frames.

In testimony whereof I affix my signature.

EDWARD M. MORRIS.